United States Patent [19]
Murakami et al.

[11] Patent Number: 4,948,926
[45] Date of Patent: Aug. 14, 1990

[54] POSITION DETECTING APPARATUS

[75] Inventors: Azuma Murakami; Tsuguya Yamanami; Takahiko Funahashi; Toshiaki Senda, all of Saitama, Japan

[73] Assignee: Kabushiki Kaisha Wakom, Saitama, Japan

[21] Appl. No.: 302,532

[22] Filed: Jan. 26, 1989

[30] Foreign Application Priority Data

Jan. 29, 1988 [JP] Japan ............................ 63-17250

[51] Int. Cl.⁵ ............................................. G08C 21/00
[52] U.S. Cl. ........................................................ 178/19
[58] Field of Search ..................................... 178/18, 19

[56] References Cited

U.S. PATENT DOCUMENTS

| | | | |
|---|---|---|---|
| 4,029,899 | 6/1977 | Gordon | 178/19 |
| 4,560,830 | 12/1985 | Perl | 178/19 |
| 4,786,765 | 11/1988 | Yamanomi et al. | 178/19 |
| 4,794,209 | 12/1988 | Asada et al. | 178/19 |

FOREIGN PATENT DOCUMENTS 0259894 3/1988 European Pat. Off. .
58-76933 5/1983 Japan .

Primary Examiner—Stafford D. Schreyer
Attorney, Agent, or Firm—Lowe, Price, LeBlanc, Becker & Shur

[57] ABSTRACT

A position detecting apparatus for detecting a position pointed by an input pen which comprises: a position detection section constituted by first and second coil groups each composed of a plurality of loop coils; an input pen having a tuning circuit having a predetermined frequency as a tuning frequency; selector means for successively selecting the loop coils of the first and second coil groups of the position detection section one by one; signal generation means for supplying an A.C. signal of the predetermined frequency to the loop coils; signal detection means for detecting the A.C. signal of the predetermined frequency from the loop coils; and controller means for identifying the position pointed by the position pointer on the basis of the A.C. signal detected by the signal detection means from among the loop coils of the first and second coil groups, whereby the position pointed by the input pen can be detected on the basis of the induced voltages obtained in the first and second coil groups. Because each of the first and second coil groups is constituted by a plurality of patterned coil portions, the position detecting apparatus can be made so as to have high resolution with the reduced number of coils.

55 Claims, 10 Drawing Sheets

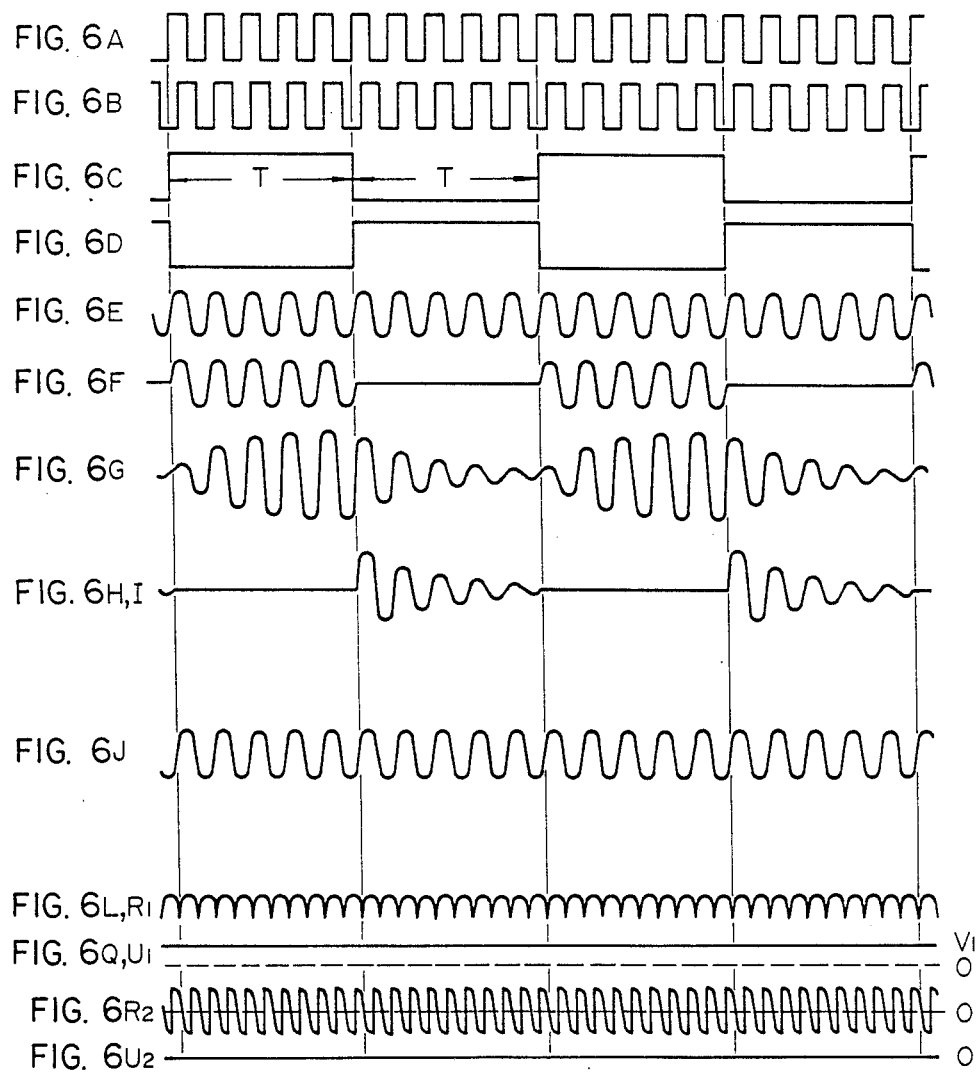

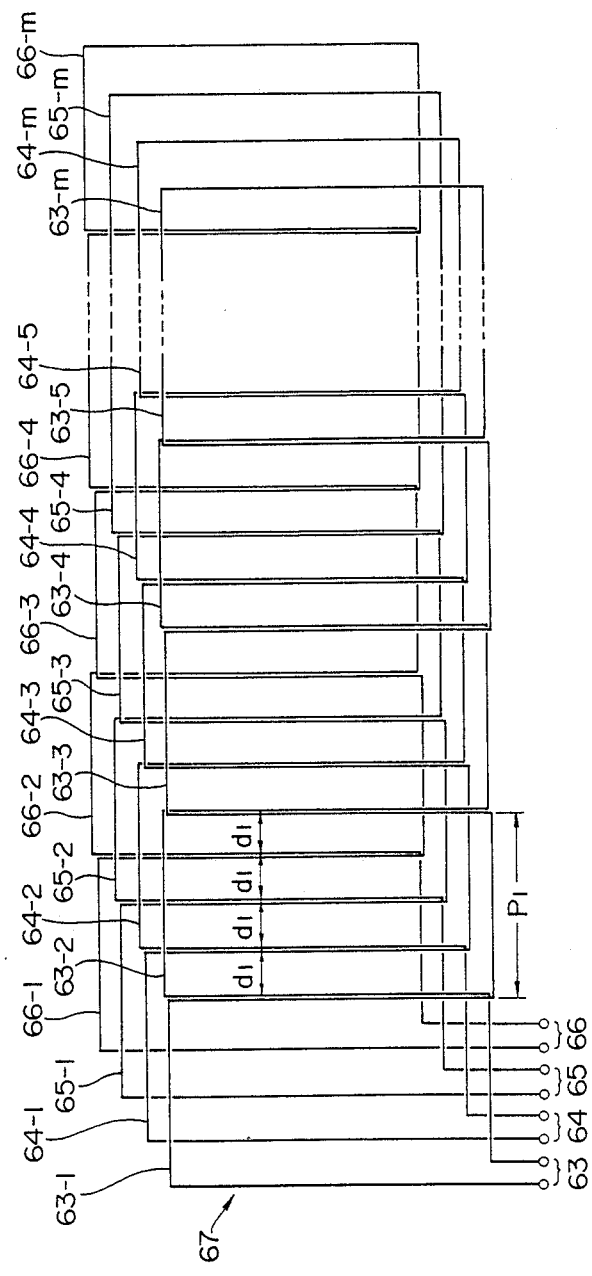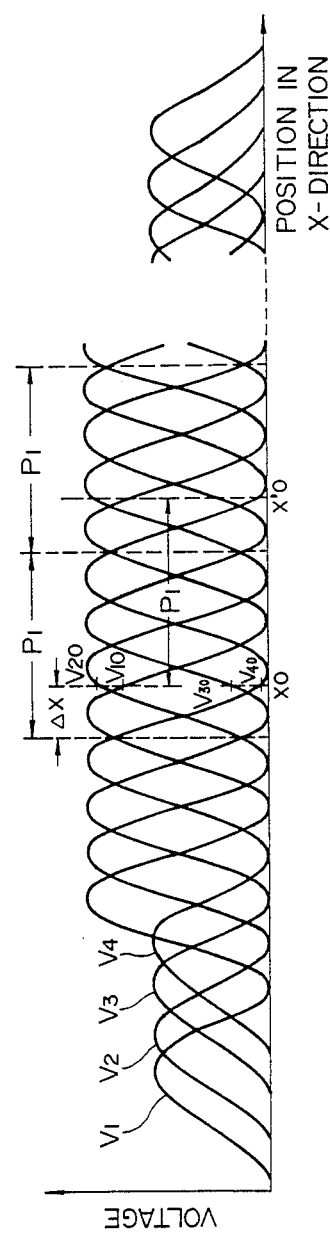
FIG. 7a
FIG. 7b

POSITION DETECTING APPARATUS

BACKGROUND OF THE INVENTION

1. Field of the Invention

The present invention relates to a position detecting apparatus for detecting the position of a position detection section pointed by a cordless position pointer and, more particularly, it relates to a position detecting apparatus including a position pointer provided with a tuning circuit and a position detection section provided with loop coils for transmitting electric wave by which a designated position of the position detection section can be detected by using the reflection of the electric wave from the position pointer.

2. Prior Art

A position detecting apparatus having a position detection section provided with a large number of signal lines arrayed at predetermined intervals both in the X-direction and in the Y-direction, and a position pointer for pointing a suitable measurement position of the position detection section, in which the position pointed by the position pointer is identified by catching the position as the X-Y co-ordinates by driving the X-direction and Y-direction signal lines successively, has been widely used as a graphic/character input apparatus generally called "tablet" or "digitizer".

As one of the apparatus of the type described above, a graphic information input apparatus is disclosed in Japanese Patent Unexamined Publication No. 58-176933 laid open on May 10, 1983. The graphic information input apparatus has a position detection section in which a plurality of driving lines are arranged at intervals in the X-direction and a plurality of detecting lines are arranged at intervals in the Y-direction and perpendicularly to the driving lines, and a position pointer having a magnetic material such as ferrite. In the disclosed apparatus, the driving lines are successively supplied with an electric current and the detecting lines are accessed sequentially so that the position pointed by the position pointer is identified by the position of the detecting line on which the highest voltage is induced.

The disclosed apparatus has an advantage in that the position pointer is easy to handle, because the position pointer can be provided as a cordless device having nothing but a function of transmitting a magnetic signal. The position of the position detection section which can be detected is a rectangular position surrounded by the driving and detecting lines. Accordingly, the resolution of the coordinates position is determined by the pitch of the lines. A higher resolution would be obtained by reducing the pitch of the lines, but such a reduced pitch will undesirably impair the signal-to-noise ratio, S/N, of the detection signal as well as the stability of detection performance, so that improvement in the resolution is limited by itself. In addition, it is rather difficult to detect the position right above each of intersections of the driving lines and the detecting lines. Furthermore, the disclosed apparatus has also a problem in that it is difficult to detect the position if the position pointer cannot be placed in the very close proximity of each driving line.

Therefore, the assignee of the present application has already proposed a position detecting apparatus as disclosed in European Patent Application Publication No. 0 259 894 dated Mar. 16, 1988 (corresponding to U.S. patent application Ser. No. 95,702 filed Sept. 14, 1987).

The proposed apparatus has a position detection section in which a plurality of loop coils having rectangular patterns are arranged at predetermined intervals both in the X-direction and in the Y-direction, and a position pointer having a tuning circuit including a coil and a capacitor and adapted to resonate with electric wave produced by the loop coils. The proposed apparatus further has a selection circuit for successively selecting the loop coils one by one, a transmission circuit for generating an A.C. signal of a predetermined frequency to be supplied to the loop coils, a receiving circuit for detecting an induced voltage of a frequency substantially the same as that of the A.C. signal of the transmission circuit out of various voltages induced in the loop coils, a connection switching circuit for connecting the selected loop coil to the transmission circuit and the receiving circuit, and a controller means for determining the position pointed by the position pointer on the basis of the levels of voltages induced in the loop coils.

In the proposed position detecting apparatus, a loop coil is selected out of a plurality of loop coils by the selection circuit and the transmission circuit is connected to this selected loop coil by means of the connection switching circuit so that an A.C. current is supplied to the loop coil, by which an electric wave is generated by the loop coil. The electric wave thus generated excites the coil in the position pointer which points a position on the position detection area, so that a voltage is induced in the coil in synchronization with the A.C. current. If the connection switching circuit is changed over from the transmission circuit side to the receiving circuit side, the electric wave from the selected loop coil will stop. Thereafter, the receiving circuit is connected to the loop coil selected by the connection switching circuit and, at the same time, the supply of the A.C. current is ceased so that the electric wave is extinguished. Meanwhile, a current corresponding to the induced voltage flows in the tuning circuit in the position pointer, so that the coil in the tuning circuit generates an electric wave. This electric wave reversely excites the loop coil which has been selected and connected to the receiving circuit, so that a voltage is induced in the loop coil. The aforementioned change-over between the electric-wave transmission and reception is conducted successively on all the loop coils. Because this change-over between the electric-wave transmission and reception relies upon resonance between each loop coil and the coil in the position pointer, the level of the voltage induced in the loop coil has such a dependency on the distance between the loop coil and the coil of the position pointer that the level of the induced voltage is highest in the loop coil which is closest to the present position pointed by the position pointer and is gradually decreased as the distance between the loop coil and the coil of the position detector is increased. The levels of voltages induced in these loop coils are processed by the controller means so that the coordinates of the position pointed by the position pointer can be identified by the position of the loop coil which exhibits the highest level of the induced voltage among the loop coils. Because the position pointed by the position pointer is determined by the induced voltage thus detected, the precision of position detection can be increased by enhancing the precision of arithmetic operation of the controller means on the levels of induced voltages in the plurality of loop coils. Thus, a

SUMMARY OF THE INVENTION

An object of the present invention is to provide a position detecting apparatus incorporating a cordless position pointer which is not connected to any part of the stationary portion of the apparatus, thus facilitating the handling while attaining a high degree of precision in position detection and, at the same time, capable of detecting two-dimensional coordinates value of the pointed position in a rectangular coordinate system.

Another object of the invention is to provide a position detecting apparatus incorporating a position detection section having a plurality of loop coils which are respectively composed of a plurality of coils and are arranged at predetermined intervals, thus attaining a high degree of resolution.

A further object of the invention is to provide a position detecting apparatus incorporating a few number of switching means for selecting the loop coils, thus attaining a reduction of the number of parts while attaining reduction of the weight of the apparatus.

To attain the above objects, according to the present invention, there is provided a position detecting apparatus which comprises: a position detection section having first and second coil groups provided on a substrate, each of the coil groups being composed of a plurality of loop coils; a position pointer having a tuning circuit including at least one coil and one capacitor and having a predetermined frequency as a tuning frequency; selection means for successively selecting the loop coils of each of the first and second coil groups of the position detection section one by one; signal generation means for applying an A.C. signal of the predetermined frequency to the loop coils; signal detection means for detecting the A.C. signal of the predetermined frequency from the loop coils; and controller means for identifying a position pointed by the position pointer on the basis of the A.C. signal detected by the signal detection means from each of the loop coils of each of the first and second coil groups. Each of the loop coils of each of the first and second coil groups is composed of a plurality of substantially rectangular coil sections formed continuously. The loop coils of the first coil group are arranged with displacement from one another by a predetermined pitch $d_1$ along the direction of position detection, and each of the rectangular coil sections of each of the loop coils of the first coil group is composed of a first part extending substantially perpendicularly to the direction of position detection, a second part extending substantially in parallel to the first part at an interval of predetermined pitch P1, and a third part for connection between the forward end of the first part and the starting point of the second part. Similarly, the loop coils of the second coil group are arranged with displacement from one another by a predetermined pitch $d_2$ along the direction of position detection, and each of the rectangular coil sections of each of the loop coils of the second coil group is composed of a fourth part extending substantially perpendicularly to the direction of position detection, a fifth part extending substantially in parallel to the fourth part at an interval of predetermined pitch P2, and a sixth part for connection between the forward end of the fourth part and the starting point of the fifth part.

As described above, the position pointer requires nothing but a tuning circuit composed of a coil and a capacitor, so that the position pointer can be provided as a cordless device. Further, the position pointer does not require any magnet and any electric source. The loop coils of the position detection section are grouped into the first and second coil groups each composed of a plurality of coil sections and arranged to cover substantially the whole surface of the position detection section. Accordingly, the loop coils of this position detection section can be remarkably reduced in number compared with those of the conventional position detection section. Accordingly, the number of selector elements in the selection means can be reduced remarkably. Further, each of the first and second coil groups is composed of a plurality of loop coil sections which have the same form and are arranged with displacement by a pitch $d_1$ and by a pitch $d_2$, respectively, so that the levels of voltages coinciding with each other can be detected. Accordingly, as the number of detected voltages increase, the precision of position detection in the position detecting apparatus increases, and, at the same time, the resolution of the apparatus increases.

BRIEF DESCRIPTION OF THE DRAWINGS

Other features and advantages of the present invention will be apparent from the following description taken in connection with the accompanying drawings, in which:

FIG. 6 is a waveform chart showing waveforms of signals obtained in various portions of the embodiment of FIG. 1;

FIGS. 7a and 7b are views showing the respective loop coils in the first coil group and the change of voltages detected from the loop coils, in which FIG. 7a shows the patterns of loop coils in the first coil group and FIG. 7b shows the waveforms of voltages detected corresponding to these patterns;

FIGS. 8a and 8b are views showing loop coils picked up by each one out of the first and second coil groups and the change of voltages detected from the loop coils, in which FIG. 8a shows the patterns of the loop coils, and FIG. 8b shows the waveforms of voltages detected corresponding to these patterns;

DESCRIPTION OF THE PREFERRED EMBODIMENTS

Figure 1:
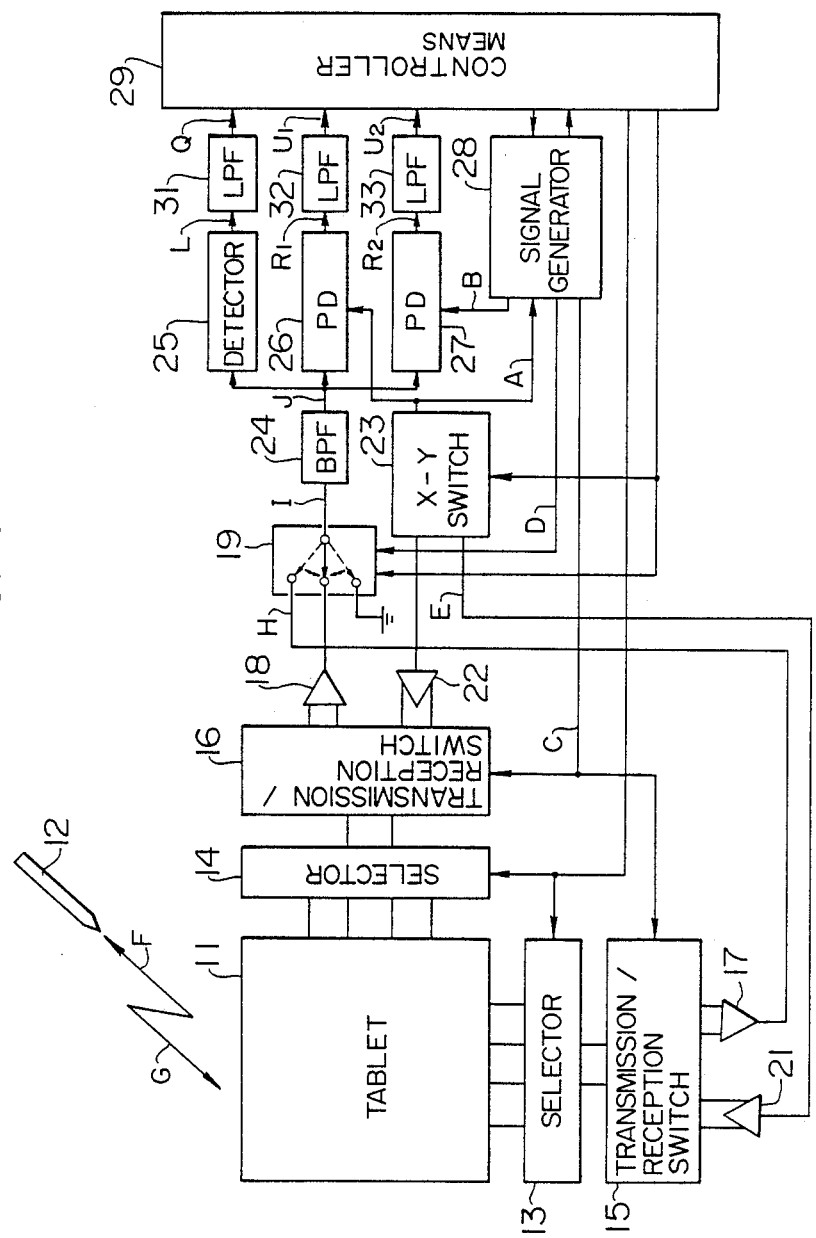
FIG. 1 is a block diagram showing the basic construction of an embodiment of the position detecting apparatus according to the present invention.

Referring to FIG. 1, there is shown an embodiment of the position detecting apparatus in accordance with the present invention. In this embodiment the apparatus is applied to a digitizer for detecting the position pointed in two-dimensional directions, that is, in the X-direction and Y-direction. The position to be identified in the position detection section (hereinafter called "tablet") 11 having loop coils arranged on a substrate 75 (FIG. 3) at predetermined intervals in the X- and Y-directions as will be described later, is pointed by a position pointer (hereinafter called "input pen") 12, details of which will be described later. Selector means 13 and 14 which may be constituted by known multiplexers and provided for successively switching the X- and Y-direction loop coils, are connected to the tablet 11. These selector means 13 and 14 are respectively connected to transmission/reception switching circuits 15 and 16 for the purposes of transmitting signals to the loop coils and reception signals from the loop coils. The receiving sides of the transmission/reception switching circuits 15 and 16 are connected to a reception timing switching means 19 which may be constituted by switches for attaining the timing of reception in the X- and Y-directions through amplifiers 17 and 18. The transmission sides of the transmission/reception switching circuits 15 and 16 are connected to an X-Y switching means 23 which may be constituted by switches for conducting the switching of transmission in the X- and Y-directions through driving circuits 21 and 22. These selector means 13 and 14, transmission/reception switching circuits 15 and 16, reception timing switching means 19 and X-Y switching means 23 constitute a connection switching means.

The reception timing switching means 19 is connected to a detector 25, a first phase detector (PD) 26 and a second phase detector (PD) 27 through a bandpass filter 24 which constitutes a signal detecting means. The first phase detector (PD) 26 and a signal generator 28 are connected to the X-Y switching circuit 23. The signal generator 28 is connected also to the reception timing switching circuit 19 so that the reception timing switching means 19 can be controlled so as not to be connected to any one of the amplifiers 17 and 18 when signals from the signal generator 28 are supplied to the transmission/reception switching circuits 15 and 16. The operation of the signal generator 28 is controlled by a controller means 29 which may be constituted by a micor-processor. The detector 25, the first phase detector 26 and the second phase detector 27 are connected to the controller means 29 through a first low-pass filter (LPF) 31, a second low-pass filter (LPF) 32 and a third low-pass filter (LPF) 33, respectively. This controller means 29 is connected to control the switching operations of the selector means 13 and 14, the reception timing switching means 19 and the X-Y switching means 23.

Figure 2:
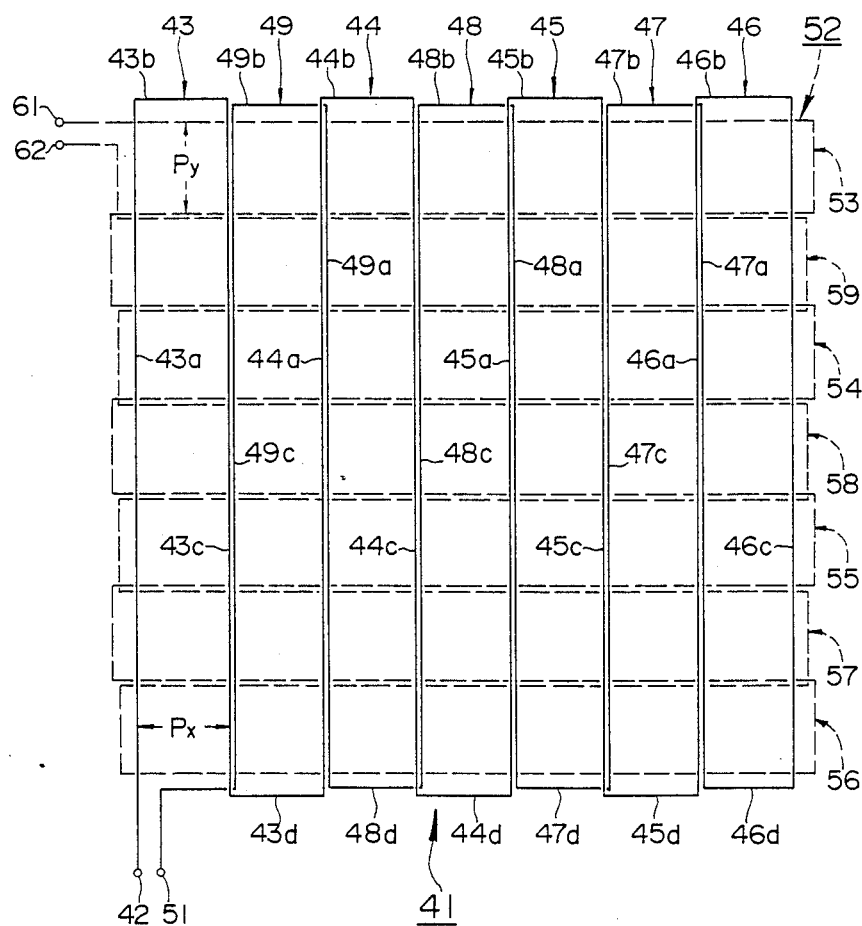
FIG. 2 is a diagram for explaining the basic pattern of X-and Y-direction loop coils which form a tablet.

Referring to FIG. 2, there are shown one X-direction loop coil and one Y-direction loop coil which are picked up from the plurality of X- and Y-direction loop coils in the tablet 10, for description of the basic pattern of the loop coils. The X-direction loop coil 41 has a first coil section 43, a second coil section 44, a third coil section 45 and a fourth coil section 46. The substantially rectangularly shaped first coil section 43 is composed of a first part 43a extending in the Y-direction from a connection terminal 42, a second part 43b extending substantially perpendicularly to the first part 43a by a length corresponding to the length of a predetermined pitch Px from the ending point of the first part 43a, and a third part 43c extending substantially perpendicularly to the second part 43b from the ending point of the second part 43b so that the direction of an electric current or the direction of magnetic flux can be reversed. Similarly to this, the second coil section 44 is composed of a first part 44a extending perpendicularly to a connection part 43d extending perpendicularly to the third part 43c of the first coil 43 by a length corresponding to the length of the pitch Px from the ending point thereof, a second part 44b, and a third part 44c. Similarly, the third coil section 45 is composed of a first part 45a provided through a connection part 44d, a second part 45b, and a third part 45c. Similarly, the fourth coil section 46 is composed of a first part 46a provided through a connection part 45d, a second part 46b, and a third part 46c. The loop coil 41 further has a fifth coil section 47, a sixth coil section 48 and a seventh coil section 49. The fifth coil section 47 is composed of a first part 47a extending perpendicularly to a connection part 46d extending perpendicularly to the third part 46c of the fourth coil section 46 from the ending point thereof so that the first part 47a of the fifth coil section 47 is arranged in parallel to the third part 46a of the fourth part section 46 at a slight distance, a second part 47b extending perpendicularly to the first part 47a by a length corresponding to the length of the pitch Px from the ending point thereof, and a third part 47c extending perpendicularly to the second part 43b from the ending point thereof so that the direction of an electric current or the direction of magnetic flux can be reversed and being arranged in parallel to the third part 45c of the third coil section 45 at a slight distance. Similarly, the six coil section 48 is composed of a first part 48a provided through a connection part 47d, a second part 48b, and a third part 48c. Similarly, the seventh coil section 49 is composed of a first part 49a provided through a connection part 48d, a second part 49b, and a third part 49c. The third part 49c of the seventh coil section 49 is connected to a connection terminal 51. Accordingly, a current or flux of the same direction flows in two parts adjacent to each other at a slight distance, for example, in the third parts 43c and 49c of the first and seventh coil sections 43 and 49, so that a high output can be generally attained even if the signal output of the signal generator 28 is low.

In FIG. 2, the Y-direction loop coil 52 is distinguished by the dot line from the X-direction loop coil 41. The Y-direction loop coil 52 has seven coil sections (a first coil section 53 to a seventh coil section 59) arranged by the same pattern as that of the X-direction loop coil 41. The arrangement of the respective coil sections in the Y-direction loop coil 52 is similar to that of the respective coil sections in the X-direction loop coil 41. Details of those coil sections in the Y-direction loop coil 52 will therefore be omitted. The Y-direction loop coil 52 is arranged so that the first and third parts of each coil section thereof intersect the first and third parts of each coil section of the X-direction loop coil 41 at an angle of about 90°. The Y-direction loop coil 52 is connected between connection terminals 61 and 62.

Figure 3:
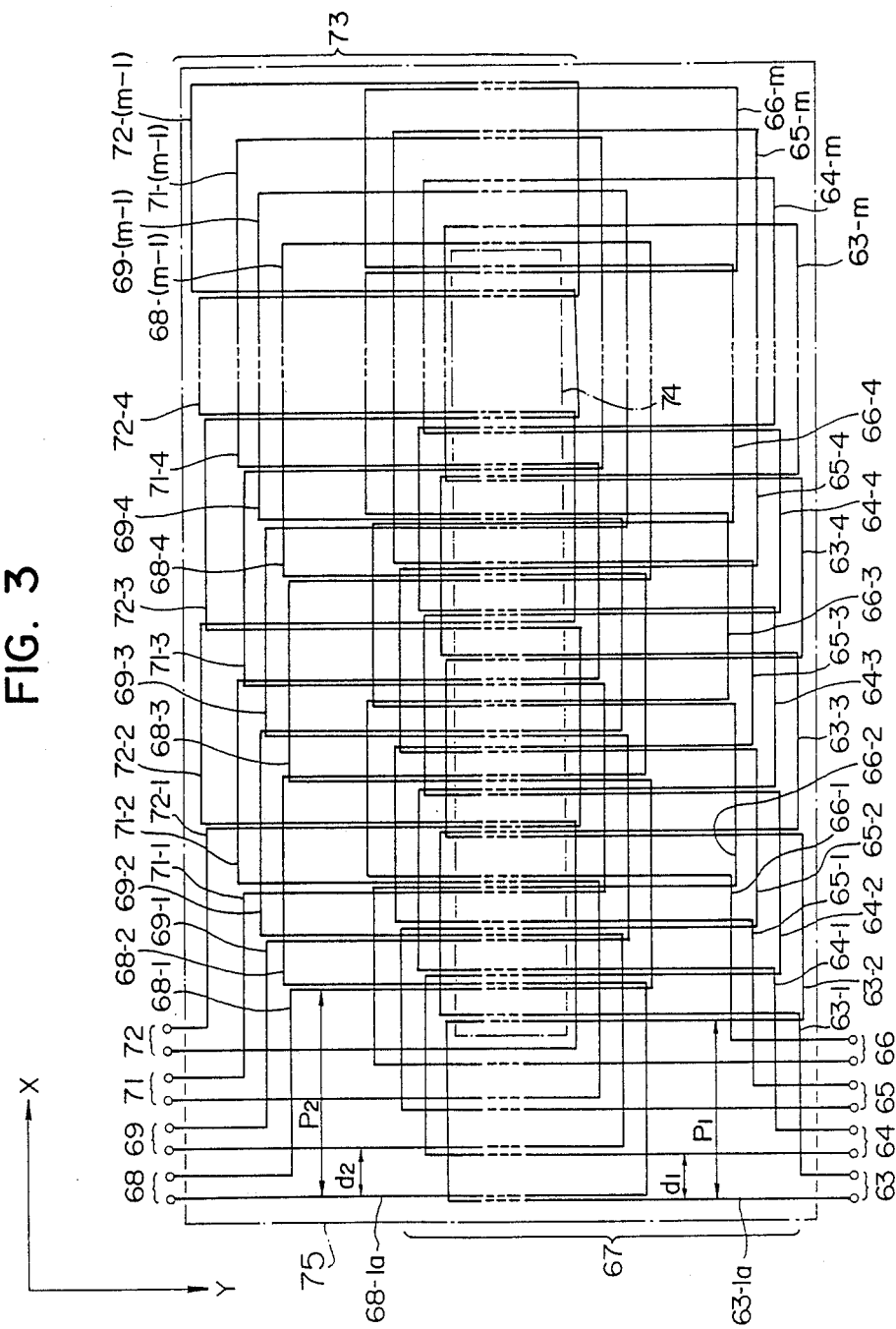
FIG. 3 is a partly cutaway diagram of the loop coils in the X-direction of the tablet.

The pattern of the loop coils of FIG. 2 is illustrated for the purpose of well understanding the construction of this embodiment. In this embodiment, eight loop coils are arranged as shown in FIG. 3 to thereby form a tablet 11. For simplification, only the coils in the X- direction are shown in FIG. 3. The X-direction coils are grouped into two coil groups consisting of a first X-direction coil group 67 composed of four loop coils 63, 64, 65 and 66 and a second X-direction coil group 73 composed of four loop coils 68, 69, 71 and 72. The reason why each of the coil groups 67 and 73 is composed of four loop coils is to make the resolution high.

The loop coil 63 is composed of a number, m, of substantially rectangular coil sections 63-1, 63-2, 63-3, ..., and 63-m respectively having long sides which are extended in the Y-direction but reversed in extending direction so that the direction of a current passing therethrough or flux is reversed alternately at every predetermined pitch P1 along the direction of position detection, that is, along the X-direction. Similarly, the loop coils 64, 65 and 66 are composed of m coil sections 64-1, 64-2, 64-3, ..., and 64-m; 65-1, 65-2, 65-3, ..., and 65-m; 66-1, 66-2, 66-3, ..., and 66-m, respectively. In FIG. 3 and the following description, the coils are numbered from the left of the drawing for the purpose of simplification of description. Further, the loop coils 63 to 66 are arranged with displacement from one another by an interval of $d_1$ in the X-direction.

On the other hand, the loop coil 68 in the second X-direction coil group 73 is composed of a number, (m-1), of substantially rectangular coil sections 68-1, 68-2, 68-3, ..., and 68-(m-1) respectively having long sides which are extended in the X-direction but reversed in extending direction so that the direction of a current passing therethrough or flux is reversed alternately at every predetermined pitch P2 along the X-direction. Similarly, the loop coils 69, 71 and 72 are composed of (m-1) coil sections 69-1, 69-2, 69-3, ..., and 69-(m-1);71-1, 71-2, 71-3, ..., and 71-(m-1); and 72-1, 72-2, 72-3, ..., and 72-(m-1), respectively. The loop coils 68 to 72 are arranged with displacement by an interval of $d_2$ in X-direction.

In this embodiment the first X-direction coil group 67 and the second X-direction coil group 73 are arranged to overlap each other so that the starting points thereof, that is, one end 63-1a of the coil section 63-1 of the loop coil 63 and one end 68-1a of the coil section 68-1 of the loop coil 68 coincide with each other. However, such coincidence is not always required. In the drawing, the coils 63 and 68 are shown separately for the purpose of distinguishing. The position detection area is within a range surrounded by the dot-and-dash line designated by the reference numeral 74. The loop coils 63 to 72 are used in combination with selector elements (not shown) of the selector means 13. For example, the loop coils 63 and 68 are used in combination with a first selector element (not shown) of the selector means 13; the loop coils 64 and 69 are used in combination with a second selector element (not shown) of the selector means 13. As described above, the four pairs of loop coils are successively selected by the selector elements of the selector means 13. Accordingly, the selector elements of the selector means can be simplified in construction.

Though not shown, the first and second Y-direction coil groups as to the Y-direction of the tablet 10 are similarly arranged to overlap each other so that the position detection directions thereof intersect each other. The X- and Y-direction loop coils are arranged on the substrate 75.

Figure 4:
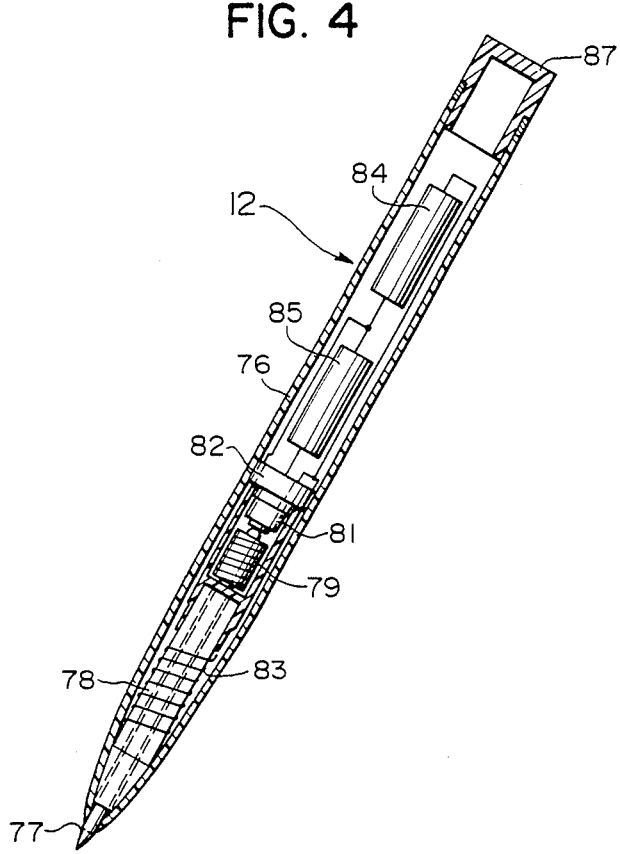
FIG. 4 is a plan view partly in section, showing the internal construction of the input pen.
Figure 5:
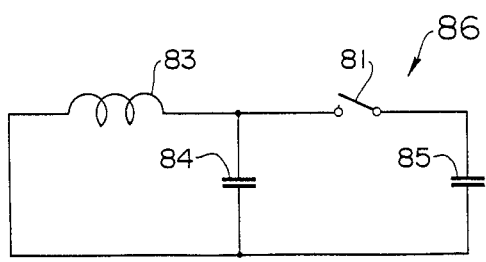
FIG. 5 is a circuit diagram showing the electrical construction of the input pen.

Referring to FIG. 4, the detailed construction of the input pen 12 is shown. The input pen 12 has a hollow and tapering casing 76 made of a non-metallic material such as a synthetic resin and shaped like a ball point pen, and a pointing member 77 similar to the core of a ball point pen. The pointing member 77 is inserted into the tapering portion of the casing 76 so that one end of the pointing member 77 is movable relative to the top end of the casing 76. The pointing member 77 is slidably inserted into a center hole of a ferrite core 78. The opposite end of the pointing member 77 touches one end of a coiled spring 79. The opposite end of the coiled spring 79 faces a push-button switch 81 at a predetermined distance. The switch 81 is mounted to the substrate 82 fixed within the casing 76. As shown in FIG. 5, a tuning circuit 86 is constituted by a coil 83 wound around the ferrite core 78, and capacitors 84 and 85 provided within the casing 76. A cap 87 is removably provided in the rear end of the casing 76.

In short, as shown in FIG. 5, the tuning circuit 86 is constituted by a coil 83, and capacitors 84 and 85 connected to one end of the coil 83 directly and through the switch 81 respectively. As will be understood also from FIG. 5, the coil 83 is connected in series to the capacitor 84, thus constituting a resonance circuit which is known. The reactance and capacitance of the coil 83 and the capacitor 84 are selected so that the tuning circuit can resonate with a predetermined frequency $f_0$. On the other hand, the capacitor 85 is connected across the capacitor 84 through the switch 81. The parallel connection of the capacitors serves to reduce or lower the resonance frequency $f_0$ when the switch 81 is turned on. When the pointing end of the pointing member 77 is pressed onto the input surface (not shown) of the tablet 11 to be drawn into the casing 76 while the casing 76 is grasped by hand or the like, the switch 81 is pressed by the rear end of the pointing member 77 through the coiled spring 79 so that the switch 81 is turned on. When the pointing member 81 is released, on the contrary, the switch 81 is turned off.

The operation of this embodiment will be described more in detail hereunder. The description will be commenced first in regard to the exchange of electric waves between the tablet 11 and the input pen 12, as well as signals obtained as a result of the exchange of the electric waves, with reference to FIG. 6.

The controller means 29 controls the signal generator 28, and, at the same time, controls the switching of the loop coils of the tablet 11 through the selector means 13 and 14 in accordance with the flow chart which will be described later. Further, the controller means 29 controls the switching operations of the X-Y switching means 23 and the reception timing switching means 19 in the direction of coordinates detection. In addition, the controller means 29 obtains the coordinates of the position pointed by the input pen 12 by processing signals representing the levels of output voltages from the first, second and third low-pass filters 31, 32 and 33 through A/D conversion and, further, detects the phase of the reception signal to discriminate the state of the switch.

The selector means 13 successively selects one loop coil from the first and second X-direction coil groups 67 and 73 on the basis of the information given from the controller means 29. On the other hand, the selector means 14 successively selects one loop coil from the first and second Y-direction coil groups not shown. The transmission/reception switching circuit 15 alternately connects the selected X-direction loop coil to the driving circuit 21 and the amplifier 17. On the other hand, the transmission/reception switching circuit 16 alternately connects the selected Y-direction loop coil to the driving circuit 22 and the amplifier 18.

The signal generator 28 generates a rectangular signal A of a predetermined frequency $f_0$, a signal B having a phase lagged by an angle of 90° from the phase of the rectangular signal A, a transmission/reception switching signal C of a predetermined frequency $f_k$, and a reception timing signal D. The rectangular signal A is directly supplied to the first phase detector 26, converted into a sine-wave signal E by a low-pass filter not shown and then supplied to selected one of the driving circuits 21 and 22 through the X-Y switching means 23. The rectangular signal B is supplied to the second phase detector 27. The transmission/reception switching signal C is supplied to the transmission/reception switching circuits 15 and 16. The reception timing signal D is supplied to the reception timing switching means 19.

If information for X-direction selection is given to the X-Y switching means 23 and the reception timing switching means 19 from the controller means 29, the sine-wave signal E is supplied to the driving circuit 21, converted into a balanced signal and then supplied to the transmission/reception switching circuit 15. Because the transmission/reception switching circuit 15 connects selected one of the driving circuit 21 and the amplifier 17 on the basis of the transmission/reception switching signal C, the signal supplied from the transmission/reception switching circuit 15 to the selector means 13 is represented by an intermittent signal F having a frequency $f_0$ and being supplied to the selector means 13 at every other period T ($=\frac{1}{2}f_k$).

The signal F is supplied to selected one of the X-direction loop coils, for example, the loop coil 63, of the tablet 11 through the selector means 13, so that the loop coil 63 generates an electric wave on the basis of the signal F.

If the input pen 12 is erected on the tablet 11 or in other words if the input pen 12 is now in use, the aforementioned electric wave excites the coil 83 of the input pen 12 so that a voltage G is induced in the tuning circuit 86 in synchronization with the signal F.

The receiving period begins when the duration of the signal F expires. As the receiving period starts, the loop coil 11 is switched to the amplifier 17 side so that the electric wave from the loop coil 11 extinguishes without delay. However, the induced voltage G is progressively attenuated in accordance with the loss in the tuning circuit 86.

On the other hand, the current flowing in the tuning circuit 86 on the basis of the induced voltage G serves to transmit an electric wave from the coil 83. Because the electric wave is reversely excites the loop coil 63 connected to the amplifier 17, a voltage is induced in the loop coil 63 by the electric wave from the coil 83. The induced voltage is supplied to the amplifier through the transmission/reception switching circuit 15 during the receiving period and amplified by the amplifier to form a reception signal H. The reception signal H is supplied to the reception timing switching means 19.

The reception timing switching means 19 receives selected one of the X-direction selector information and the Y-direction selection information. If the X-direction selection information, as well as the reception timing signal D substantially formed by inverting the transmission/reception switching signal C, is supplied to the reception timing switching means 19, a signal I is obtained as the output thereof because the reception signal H is passed when the level of the signal D is high and the reception signal H is not passed when the level of the signal D is low. The signal I is substantially the same as the reception signal H.

The signal I is supplied to the band-pass filter 24 which is constituted by a ceramic filter having a specific frequency $f_0$. Through the filter 24, a signal J (strictly speaking, in the state where several signals I are converged by the band-pass filter 24) having an amplitude corresponding to the energy of a frequency $f_0$ component in the signal I is supplied to the detector 25 and the first and second phase detectors 26 and 27.

The signal J thus supplied to the detector 25 is detected and rectified so that it is converted into a signal L. Then the signal L is converted, by the first low-pass filter 31 having a sufficiently low cutoff frequency, into a D.C. signal Q having a voltage level (for example, $V_1$) corresponding to about half the amplitude. The thus obtained signal Q is transferred to the controller means 29.

The voltage level $V_1$ of the signal Q depends on the distance between the input pen 12 and the loop coil 63. However, because the loop coil 63 is composed of coil sections 63-1 to 63-m formed substantially over the whole surface of the tablet 11 as described above, the voltage level $V_1$ is, in practice, determined by the position of the input pen 12 relative to the coil sections 63-1 to 63-m. This can be applied to the case where other loop coils 64 to 72 are selected. FIGS. 7a and 7b show the loop coils 63 to 66 in the first X-direction coil group 67 and the change of detection voltages thereof in the case where the input pen 12 is moved along the X-direction of the tablet 11. In FIG. 7a the loop coils 63 to 66 in the first X-direction coil group 67 are shown; and in FIG. 7b the waveforms of detection voltages corresponding to these loop coils are shown. In FIG. 7b, $V_1$ represents the detection voltage of the loop coil 63. The voltage $V_1$ is a substantially sine-wave voltage which takes maximum values in the vicinity of the middle of the coil sections 63-1 to 63-m and takes minimum values in the vicinity of the border of the coils. Similarly, $V_2$, $V_3$ and $V_4$ represent the detection voltages of the loop coils 64, 65 and 66, respectively. The voltages $V_2$, $V_3$ and $V_4$ change in the same manner as the voltage $V_1$. However, because the loop coils 63 to 66 are arranged at equal distances $d_1$ in the X-direction, the voltages $V_1$, $V_2$, $V_3$ and $V_4$ are successively delayed by a value corresponding to the distance $d_1$ in the X-direction. The portion surrounded by the coil sections 63-1, 64-1, ... 66-1 and 63-m, 64-m, ... 66-m is designed to locate in the outside of the detection area 74. As these detection voltages depend on the X-direction position of the input pen 12, the levels of voltages detected are not changed even if the input pen 12 is moved in parallel to the Y-direction.

With respect to the loop coils 68 to 72 in the second X-direction coil group 73, voltages are detected in the same manner as described above. In this case, the distance between adjacent maximum values (or minimum values) of voltage in one loop coil is equal to the pitch P2 of the coils in the loop coil and the phase difference between adjacent voltages in the loop coils 68 to 72 is equal to $d_2$.

Figure 8A:
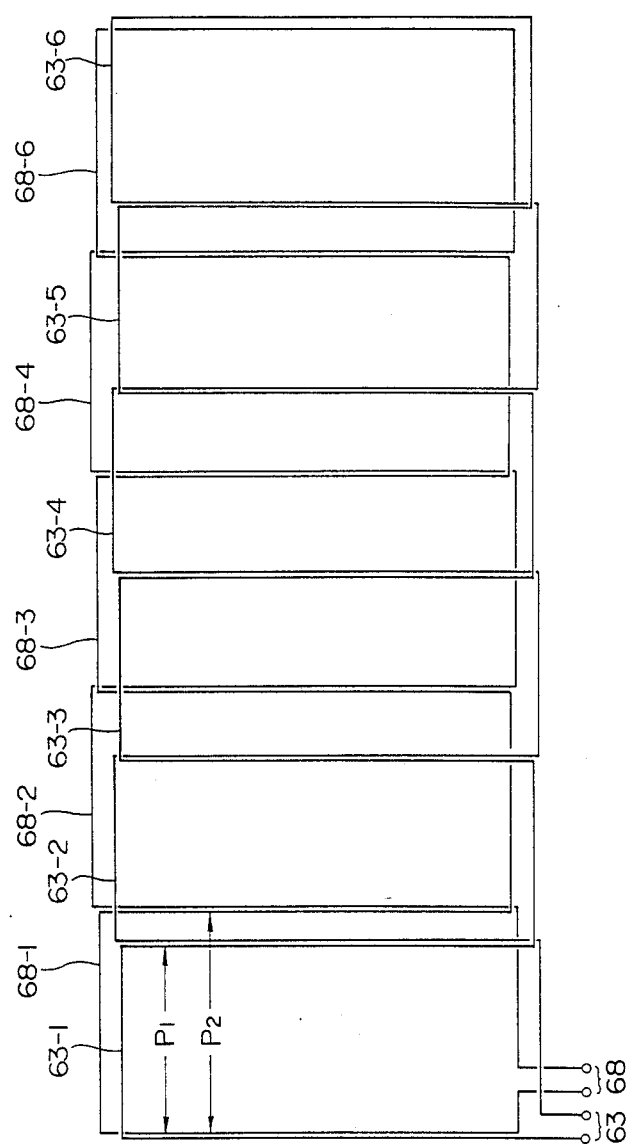
Figure 8B:
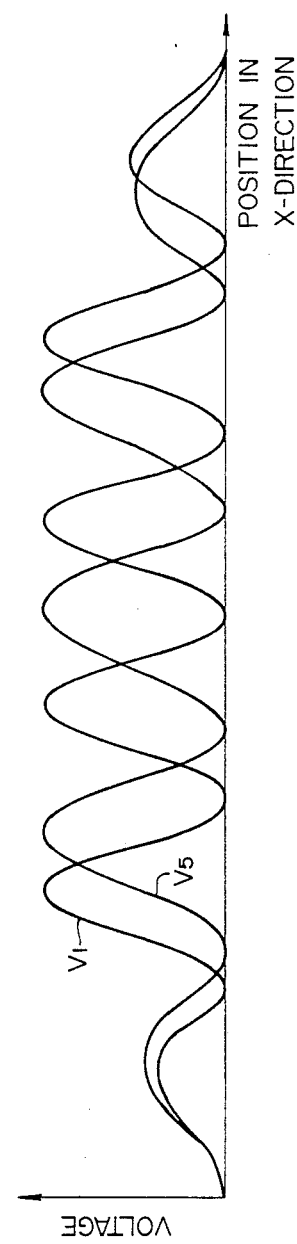

FIGS. 8a and 8b show the detection voltages $V_1$ and $V_5$ in one loop coil 63 in the first X-direction coil group 67 and one loop coil 68 in the second X-direction coil group 68. In FIG. 8a the patterns of the loop coils 63 and 68 are shown; and in FIG. 8b the waveforms of the detection voltages corresponding to these loop coils are shown. Although FIG. 8a shows the case where the loop coil 63 has six coil sections and the loop coil 68 has five coil sections, it is to be understood that FIG. 8a shows merely the basic construction of loop coils and that, in fact, each loop coil in the first coil group has a number, m, of coil sections and each loop coil in the second coil group has a number, m-1, of coil sections.

Assuming now that the input pen 12 is placed on a position $x_0$ in the X-direction in FIG. 7b, voltages $V_{10}$, $V_{20}$, $V_{30}$ and $V_{40}$ are detected from the loop coils 63, 64, 65 and 66, respectively. Because the levels of the voltages $V_1$ to $V_4$ are repeated at every pitch P1, the voltages $V_{10}$ to $V_{40}$ as described above are detected from the loop coils 63 to 66 even when the input pen 12 is placed on a position (for example, $x_0'$) where the difference in distance from the position $x_0$ multiplies integrally as against the pitch P1. However, the position where the voltages $V_{10}$ to $V_{40}$ can be detected, within an arbitrary pitch P1 containing the position $x_0$, is determined unidimensionally. Accordingly, the coordinates $\Delta x$ of the position $x_0$ within the distance of the pitch P1 from a predetermined position, for example, a position where the voltages $V_4$ and $V_1$ intersect each other, can be obtained from the voltages $V_{10}$ to $V_{40}$.

Figure 9:
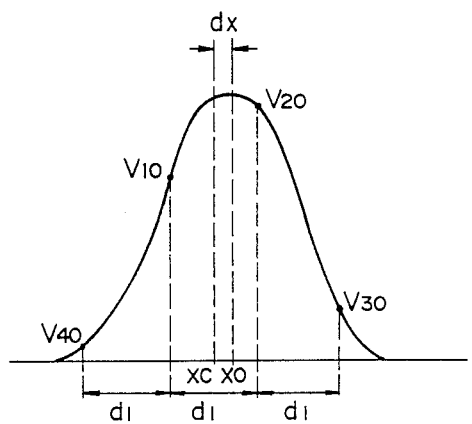
FIG. 9 is a waveform graph for explaining the calculation of a position to be measured.
Figure 10:
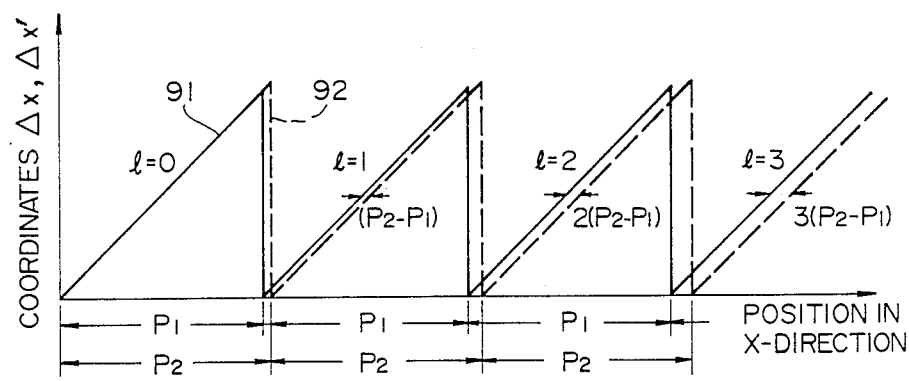
FIG. 10 is a waveform graph showing the relation between the coordinates $\Delta X$ and $\Delta X'$ and the true position.

FIG. 9 is a graph for explaining the calculation of an arbitrary position $x_0$ to be measured. In FIG. 10 the peak point corresponds to the position $x_0$ so that the coordinates $d_x$ from the center position $x_c$ (the position where the voltages $V_1$ and $V_2$ intersect each other in FIG. 7b) between the voltages $V_{10}$ and $V_{20}$ to the peak point is calculated by the following equation (3) using the maximum voltage $V_{20}$ and the voltages $V_{10}$ and $V_{30}$ based on calculus of finite differences.

$$d_x = \{|V_{20}-V_{10}|\}/\{|V_{20}-V_{10}|+|V_{30}-V_{20}|\} \cdot d_1 \quad (3)$$

The equation (3) is generalized as follows.

$$d_x = \{|V_n-V_{n-1}|\}/\{|V_n-V_{n-1}|+|V_{n+1}-V_n|\} \cdot d_1 \quad (3)'$$

In the equation (3)', $V_n$ represents the maximum voltage, $V_{n-1}$ represents the voltage of a coil in the front of the coil where the voltage $V_n$ is detected, and $V_{n+1}$ represents the voltage of a coil in the rear of the coil where the voltage $V_n$ is detected.

Because the coordinates $d_x$ is a coordinates value based on the position where the voltages $V_1$ and $V_2$ intersect each other, the coordinates value is reduced by the distance $d_1$ compared with the value of the coordinates $\Delta x$.

In short, when the maximum voltage is $V_1$, the coordinates $d_x$ takes a value based on the position where the voltages $V_4$ and $V_1$ intersect each other, and when the maximum voltage is $V_2$, $V_3$ or $V_4$, the coordinates $d_x$ takes a value based on the position where the voltages $V_1$ and $V_2$ intersect each other or based on the position where the voltages $V_2$ and $V_3$ intersect each other or based on the position where the voltages $V_3$ and $V_4$ intersect each other.

Accordingly, in order to obtain the coordinates $\Delta x$ based on the position where the voltages $V_4$ and $V_1$ intersect each other, it is necessary to add integral (0 to 3) multiples of the distance $d_1$ to the coordinates $d_x$ on the basis of the judgment as to what is the maximum one of the voltages $V_1$ to $V_4$. Accordingly, when the maximum voltage is $V_1$, the coordinates $\Delta x$ can be obtained as follows.

$$\Delta x = d_x \quad (4-1)$$

When the maximum voltage is $V_2$, the coordinates $\Delta x$ can be obtained as follows.

$$\Delta x = d_x + d_1 \quad (4-2)$$

When the maximum voltage is $V_3$, the coordinates $\Delta x$ can be obtained as follows.

$$\Delta x = d_x + 2d_1 \quad (4-3)$$

When the maximum voltage is $V_4$, the coordinates $\Delta x$ can be obtained as follows.

$$\Delta x = d_x + 3d_1 \quad (4-4)$$

On the other hand, the coordinates $\Delta x'$ of the position $x_0$ within the distance of the pitch P2 from a predetermined position, for example, a position where the voltage $V_8$ detected from the coil 72 and the voltage $V_5$ detected from the coil 68 intersect each other, can be obtained on the basis of the voltages detected from the loop coils of the second X-direction coil group in the same manner as described above.

FIG. 10 shows the relation between the coordinates $\Delta x$ and $\Delta x'$ obtained by the first and second X-direction coil groups 67 and 73 and the X-direction real position. In FIG. 10 the solid line 91 shows the coordinates $\Delta x$ and the broken line 92 shows the coordinates $\Delta x'$.

The difference between the coordinates $\Delta x$ and $\Delta x'$ is based on the difference between the pitches P1 and P2 in the first and second X-direction coil groups 67 and 73. A difference proportional to integral multiples of the difference between the pitches P1 and P2 is produced corresponding to the position of the input pen 12 which exists in any one of coils in the coil group 67. The X-direction real position $x_0$ where the input pen 12 exists can be obtained conversely on the basis of this difference.

When, for example, the input pen 12 exists in the coil section 63-1 of the loop coil 63 in the coil group 67, $\Delta x - \Delta x' = 0$. When, for example, the input pen 12 exists in the coil section 63-2, $\Delta x - \Delta x' = P2 - P1$. When, for example, the input pen 12 exists in the coil section 63-3, $\Delta x - \Delta x' = 2(P2-P1)$. Accordingly, when the coil sections 63-1, 63-2, ..., 63-m are generically represented by K (K=0, 1, 2, ..., m-1) (hereinafter called "pitch number"), the following equation can be obtained.

$$K = (\Delta x' - \Delta x)/(P2-P1) \quad (5)$$

Accordingly, the position coordinates $x_0$ can be obtained by the following equation (6).

$$x_0 = KP1 + \Delta x \quad (6)$$

In this case, the origin in the X-direction is the position where the voltages $V_4$ and $V_1$ intersect each other. (On the tablet 11, the origin is the position which is less by $d_1/2$ than the middle position of the coil section 63-1).

The Y-direction position pointed by the input pen 12 can be also obtained in the same manner as described above.

On the other hand, the first and second phase detectors 26 and 27 receive, as the detecting signals, rectangular signals A and B as shown in FIG. 6. If the phase of the signal J coincides with the phase of the rectangular signal A, the first phase detector 26 produces a signal R1 (being substantially the same as the signal L) which is formed by inverting the signal J to the positive side. The second phase detector 27 produces a signal R2 having a symmetrical waveform with respect to the positive and negative sides.

The signal R1 is converted, by the second low-pass filter 32, into a D.C. signal U1 (being substantially the same as the signal Q) having a voltage level $V_1$ corresponding to about half the amplitude of the signal J, so that the thus obtained signal U1 is transferred to the controller means 29. The signal R2 is also converted into a D.C. signal U2 by the similar low-pass filter 44, so that the thus obtained signal U2 is transferred to the controller means 29. Because the positive-side component of the signal R2 in the second phase detector 27 is the same as the negative-side component thereof, the output voltage level of the low-pass filter 44 becomes zero [V].

In the controller means 29, the output signals U1 and U2 of the second and third low-pass filters 32 and 33 are converted into corresponding digital signals and are subjected to arithmetic operation in accordance with the following equation (6) to obtain the phase difference $\theta$ between the signals supplied to the first and second phase detectors 26 and 27, that is, the signal J and the rectangular signal A.

$$\theta = -\tan^{-1}(V_q/V_p) \quad (6)$$

In the equation (6), $V_p$ represents a digital value corresponding to the output of the second low-pass filter 32 and $V_q$ represents a digital value corresponding to the output of the third low-pass filter 33. For example, in the case of the signal J as described above, the phase difference $\theta$ becomes 0° because the voltage level of the signal U2 is zero [V], that is, $V_q=0$, though the voltage level of the signal U1 is $V_1$.

The phase of the signal J varies corresponding to the tuned frequency in the tuning circuit 86 of the input pen 12. In other words, when the tuned frequency in the tuning circuit 86 coincides with the predetermined frequency $f_0$, a voltage of the frequency $f_0$ is induced both during the signal transmission period and during the signal receiving period. Further, an induced current flows in synchronism with the voltage, so that the frequency and phase of the reception signal H (or I) coincide with those of the rectangular signal A, and, consequently, the phase of the signal J coincides with the phase of the rectangular signal A.

On the other hand, when the tuned frequency in the tuning circuit 86 does not coincide with the predetermined frequency $f_0$ and has a frequency $f_1$ slightly lower than the frequency $f_0$, a voltage of the frequency $f_0$ is induced in the tuning circuit 86 in the transmission period. At this time, an induced current having a lagging phase flows in the tuning circuit 83. In the receiving period, a voltage having a frequency $f_1$ is induced and a current induced in synchronism with the voltage flows in the tuning circuit 96, so that the frequency of the reception signal H (or I) is slightly lower than the frequency of the rectangular signal A as well as the phase of the signal H is slightly lagged. Because the band-pass filter 24 serves to pass only the frequency $f_0$ as described above, the shift of frequency of the input signal into a lower side is sent out as the lagging of phase so that the phase of the signal J more lags than the reception signal H (or I).

Conversely, when the tuned frequency in the tuning circuit 86 is a frequency $f_2$ slightly higher than the predetermined frequency $f_0$, an induced current having a leading phase flows in the tuning circuit 86 while a voltage having the frequency $f_0$ is induced in the tuning circuit 86 in the transmission period. In the receiving period, on the contrary, a voltage substantially having the frequency $f_2$ is induced and an induced current flows in synchronism with the voltage in the tuning circuit 86, so that the frequency of the reception signal H (or I) is slight higher than the frequency of the rectangular signal A as well as the phase of the signal H leads slightly. In the band-pass filter 24, the shift of frequency of the input signal toward a higher frequency is sent out as a leading phase, so that the phase of the signal J more leads than the reception signal H (or I).

As described above, the tuned frequency in the tuning circuit 86 varies according to the ON/OFF state of the switch 81 of the input pen, so that the phase difference $\theta$ obtained by the equation (6) varies according to the ON/OFF state of the switch 81. Accordingly, the ON/OFF state of the switch 81 can be detected by the change in the phase difference $\theta$. The state of ON (or OFF) of the switch 81 thus detected is used as information for designating a value actually to be inputted, of the values of coordinates of the position pointed by the input pen 12.

Figure 11:
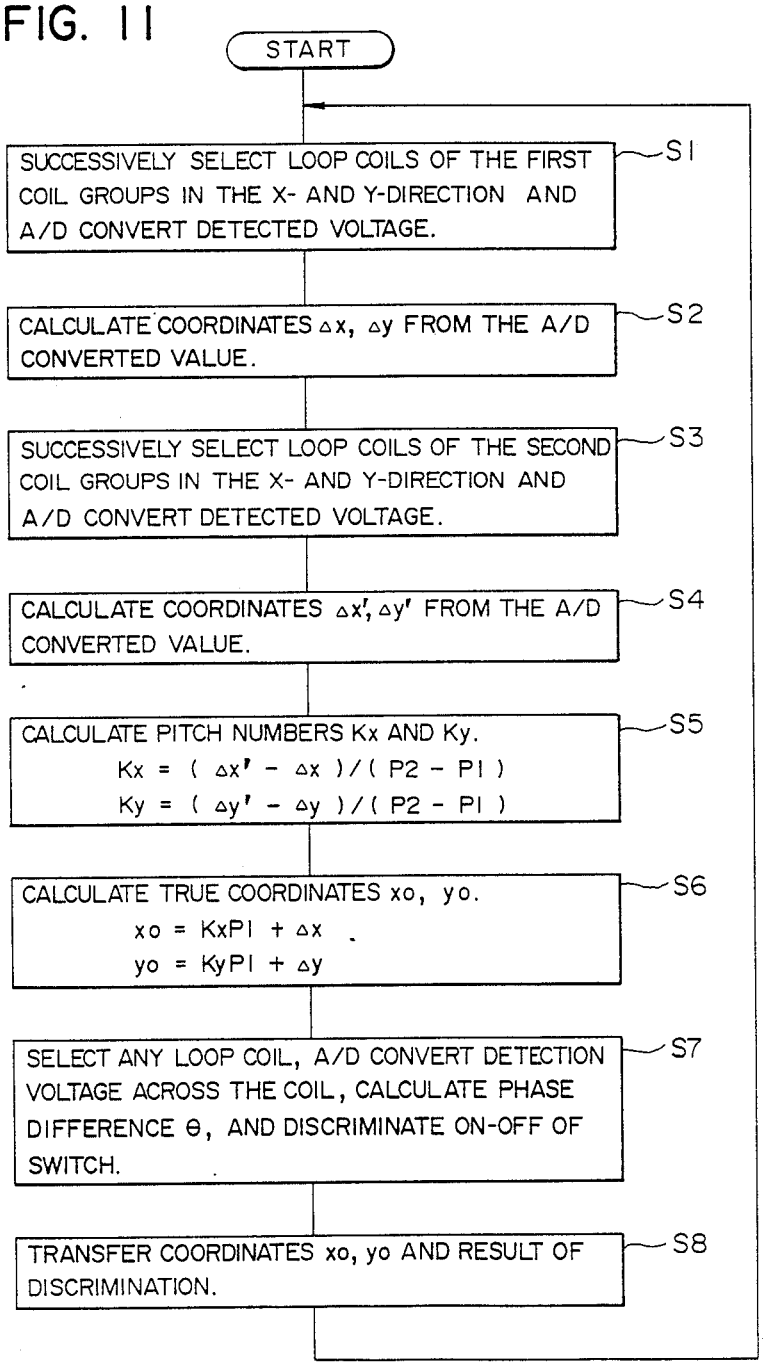
FIG. 11 is a flow chart showing the operation of the controller means.

In the following, the operation of the controller means 29 is described with reference to the flow chart shown in FIG. 11.

The position detecting operation is commenced as the power supply is turned on to supply electric power to the whole apparatus. The controller means 29 supplies both the X-Y switching means 23 and the receiving timing switching means 19 with information for selecting the X-direction. At the same time, the controller means 29 supplies the selection circuit 13 with instructions for enabling the selection circuit 13 to select the first loop coil 63 out of the loop coils 63 to 66 in the first X-direction coil group 67 of the tablet 11, thereby connecting the loop coil 63 to the transmission/receiving switching circuit 15.

The transmission/receiving switching circuit 15 connects the loop coil 63 alternately to the driving circuit 21 and the amplifier 17 in accordance with the transmission/receiving switching signal C. In the transmission period of time T, the driving circuit 21 sends 16 sine-wave signals of a frequency $f_0$ to the loop coil 63. In FIG. 6, five ones of those 16 signals are shown for the purpose of explanation.

The switching between transmission and reception is repeated seven times for each loop coil, for example, for the loop coil 63. The total period of those seven cycles of switching between transmission and reception corresponds to the period over which each loop coil is selected.

In consequence, the induced voltage is obtained at the output of the amplifier 17 in each of the seven signal-reception periods for every loop coil. The induced voltages thus obtained in the seven signal-reception periods for every loop coil are transferred to the band-pass filter 24 through the reception timing switching means 19 as explained before and are averaged by the band-pass filter 24. Then, the averaged voltage is delivered to the controller means 29 through the first, second and third low-pass filters 31, 32 and 33.

The output signal of the low-pass filter 31 is processed by the controller means 29 so as to be converted into the detection voltage $V_{11}$ corresponding to the distance between the input pen 12 and the loop coil 63. The detection voltage $V_{11}$ is stored temporally.

Then, the controller means 29 supplies the selection circuit 13 with instructions to make the selection circuit 13 to select the second loop coil 64 so that the loop coil 64 is connected to the transmission/reception switching circuit 15. Consequently, a detection voltage $V_{12}$ proportional to the distance between the input pen 12 and the loop coil 64 is obtained and stored. The foregoing operation is conducted for all the remaining loop coils 65 and 66 by successively connecting the loop coils to the transmission/reception switching circuit 15, whereby the respective detection voltages $V_{11}$ to $V_{14}$ corresponding to the X-direction distances between the input pen and the respective loop coils are obtained and stored.

Then, the controller means 29 supplies both the X-Y switching means 23 and the reception timing switching means 19 with information for selecting the Y-direction. As described above, the switching between the selection circuit 14 and the transmission/reception switching circuit 16 is conducted, so that detection voltages corresponding to the distances between the input pen and the respective loop coils of the first Y-direction coil group are obtained by A/D conversion of the output of the low-pass filter when electric waves are transmitted and received, and the detection voltages are stored temporally (Step S1).

Then, the controller means 29 executes an arithmetic operation in accordance with the equation (3)' and selected one of the equations (4-1) to (4-4) on the basis of the stored voltage values, to thereby calculate and store the coordinates $\Delta x$ and $\Delta y$ on the basis of the first X- and Y-direction coil groups (Step S2).

Then, the controller means 29 delivers to the X-Y switching means 23 and the reception timing switching means 19 information for selecting X-direction, so that the switching between the selection circuit and the transmission/reception switching circuit 15 is conducted in the same manner as described above. As the result, detection voltages corresponding to the distances between the input pen and the respective loop coils 68 to 72 of the second X-direction coil group 73 are obtained by A/D conversion of the output of the first low-pass filter 31 when electric waves are transmitted and received, and the detection voltages are stored temporally. Then, the controller means 29 supplies both the X-Y switching means 23 and the reception timing switching means 19 with information for selecting the Y-direction. As described above, the switching between the selection circuit 14 and the transmission/reception switching circuit 16 is conducted, so that detection voltages corresponding to the distances between the input pen 12 and the respective loop coils of the second Y-direction coil group are obtained by A/D conversion of the output of the first low-pass filter 31 when electric waves are transmitted and received, and the detection voltages are stored temporally (Step S3).

Then, the controller means 29 executes an arithmetic operation in accordance with the equation (3)' and selected one of the equations (4-1) to (4-4) on the basis of the stored voltage values, to thereby calculate and store the coordinates $\Delta x'$ and $\Delta y'$ on the basis of the second X- and Y-direction coil groups (Step S4).

Further, the controller means 29 executes an arithmetic operation in accordance with the equation (5) on the basis of the stored coordinates values $\Delta x$, $\Delta x'$, $\Delta y$ and $\Delta y'$, to thereby calculate the pitch numbers Kx and Ky (Step S5).

Then, the controller means 29 executes an arithmetic operation in accordance with the equation (6) on the basis of the pitch numbers, the pitch P1 and the coordinates $\Delta x$ and $\Delta y$, to thereby calculate the true coordinates $x_0$ and $y_0$ (Step S6).

Further, the controller means 29 supplies instructions to the selection circuit 13 (or 14) to make the selection circuit 13 to select arbitrary one of the X-direction loop coils 63 to 72 (or Y-direction loop coils), so that the transmission and reception of electric waves are repeated several times, for example, seven times. Consequently, the output values obtained from the second and third low-pass filters 32 and 33 are converted into corresponding digital signals, so that the phase difference $\theta$ is calculated in the same manner as described above to thereby discriminate the ON/OFF state of the switch 81 (Step S7).

The thus obtained coordinates $x_0$ and $y_0$ and the result of discrimination on the switch 81 are transferred to a computer (not shown) or the like (Step S8). The described operation is repeated.

Accordingly, as the input pen 12 is handled on the tablet 11, the coordinates of all the positions pointed by the input pen 12 are transferred to the computer or the like. If the switch 81 is turned on in this condition, the information for discrimination of the ON state of the switch 81 is transferred to the computer or the like so that the computer can recognize the coordinates value at this point of time as a coordinates value to be inputted.

Figure 12:
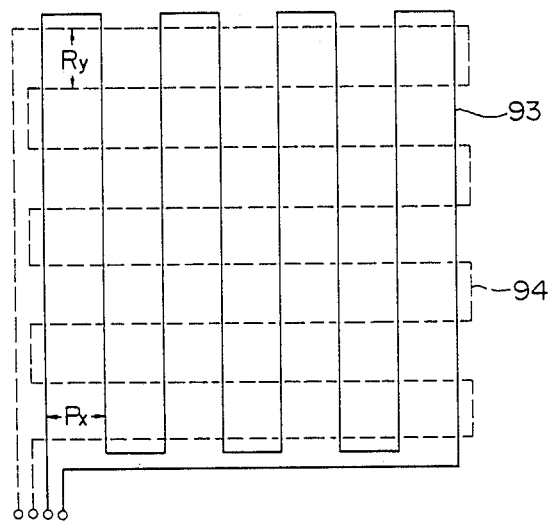
FIG. 12 is a diagram for explaining another embodiment which is different in the form of loop coils.

The aforementioned embodiment has shown the case where each of the loop coils is constituted by rectangular coil sections formed in a manner so that a conductor is reversely turned again and again at predetermined pitches from one-end side toward the opposite-end side to form part of the coil sections and then further reversely turned again and again at the predetermined pitches from the opposite-end side to the one-end side to form the remainder coil sections as illustrated in FIG. 2. However, it is to be understood that the pattern of the loop coils is not limited to the specific embodiment but may be formed, for example, in such a manner as shown in FIG. 12. In short, the coil 93 in the first X-direction coil group may be constructed in a manner so that a conductor is reversely turned again and again at predetermined pitches Px from the one-end side to the opposite-end side to form given number of substantially rectangular coil sections and then the end of the conductor is connected directly to the connection terminal after the coil section reaches the opposite-end side. Similarly, the coil 94 in the first Y-direction coil group may be constructed in a manner so that a conductor is reversely turned again and again at predetermined pitches Py from the one-end side to the opposite-end side to form given number of substantially rectangular coil sections and then the end of the conductor is connected directly to the connection terminal after the coil section reaches the opposite-end side. On the other hand, the coils in the second X- and Y-direction coil groups may be formed substantially rectangularly so that the direction of current or flux is inverted alternately at every predetermined pitch Px', Py' in the X- and Y-directions as explained before.

Figure 13:
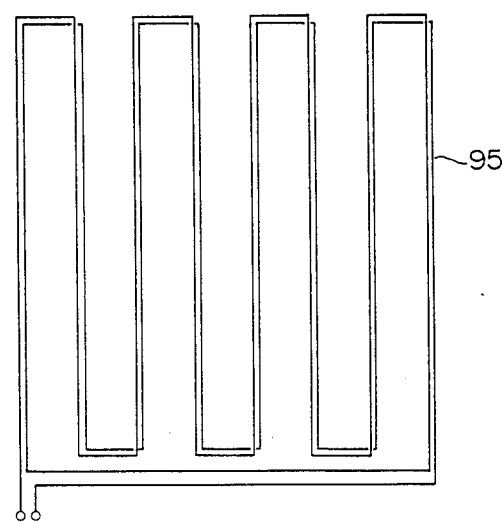
FIG. 13 is a diagram for explaining a further embodiment which is different in the form of loop coils.

As shown in FIG. 13, the coil 95 may be provided doubly for the purpose of increasing the output electric wave energy in the detection section in spite of the low level output of the signal generator 28, so that electric wave can be securely generated from the input pen 12 thus to attain reliable position detection. In this case, although it is preferable to form such a double structure by vertically putting coils one on one, the double structure may be formed by overlapping coils so that the coils displace horizontally from each other at a slight distance. It is a matter of course that the coil may have any suitable multi-layer structure of three layers or more.

In the aforementioned embodiment, the transmission/reception switching circuits 15 and 16 are provided for the purpose of transmitting signals to loop coils and receiving signals from the input pen 12. In short, the loop coils are used as an antenna for transmission as well as for reception. However, the aforementioned loop coils 63 to 72 may be used as an antenna only for transmitting signals from the signal generator 28 while a further combination of loop coils having the same pattern of the loop coils 63 to 72 are provided on the loop coils 63 to 72 through insulators as an antenna only for reception. Those coils for transmission and those coils for reception may be vertically put one on the other, or alternatively they may be horizontally slightly displaced from each other. In this configuration, the transmission/reception switching circuits 15 and 16 can be omitted to simplify the apparatus in construction.

Although the aforementioned embodiment has shown the case where each of the X- and Y-direction first and second coil groups is constructed by four loop coils for the purpose of increasing the resolution of the apparatus, it is a matter of course that each of the coil groups may be constructed by five or more loop coils for the purpose of further increasing the resolution. If such high resolution is not required, each of the first and second coil groups may be constructed by two loop coils. In this case, the position pointed by the input pen 12 is identified on the basis of two different detection voltages.

The position detecting apparatus according to the present invention may be constructed in a manner so that a plane-type display unit such as a liquid-crystal display unit is put on the tablet to indicate the input result on the display unit on real time and in combination of input and output. Further, the position detecting apparatus can be used as a terminal device for transmitting information such as handwriting letters/characters between users of the apparatus through modems connected to computers and telephone circuits. Further, the input results can be produced as hard copies through printers.

Having described the present invention as related to the preferred embodiments, it is to be understood that the invention is not limited by any of the details of description and that various modifications may be resorted to without departing from the spirit of the invention.

What is claimed is:

1. A position detecting apparatus comprising:
    a position detection section having first and second overlapping coil groups provided on a substrate, each of said coil groups including a plurality of loop coils;
    an implement having a tuning circuit including at least one coil and one capacitor, the tuning circuit having a predetermined resonant frequency;
    selection means for successively selecting said loop coils of each of said first and second coil groups of said position detection section one by one;
    signal generation means for applying an A.C. signal of said predetermined frequency to said loop coils;
    signal detection means for detecting said A.C. signal of said predetermined frequency from said loop coils; and
    controller means for identifying the position of said implement relative to said coil groups in response to said A.C. signal detected by said signal detection means from each of said loop coils of each of said first and second coil groups;
    each of said loop coils of each of said first and second coil groups including a plurality of substantially rectangular continuous coil sections;
    each of said rectangular coil sections of each of said loop coils of said first coil group including first and second parallel parts extending substantially perpendicularly to a position detection direction and spaced from each other by an interval of predetermined pitch P1, and a third part connecting corresponding ends of said first and second parts together;
    the first parts of adjacent pairs of said loop coils of said first coil group being displaced from each other by a predetermined interval $d_1$ along the position detection direction;
    each of said rectangular coil sections of each of said loop coils of said second coil group including fourth and fifth parallel parts extending substantially perpendicularly to said position detection direction and spaced from each other by an interval of predetermined pitch P1, and a sixth part connecting corresponding ends of said fourth and fifth parts together;
    the fourth parts of adjacent pairs of said loop coils of said second coil group being displaced from each other by a predetermined interval $d_2$ along the position detection direction.

2. The position detecting apparatus of claim 1 wherein each of $d_1$ and $d_2$ is less than either of P1 or P2.

3. The position detecting apparatus of claim 2, wherein said position detection section includes X-direction first and second coil groups and Y-direction first and second coil groups, said first and second coil groups being arranged in side-by-side fashion in the X-direction and in the Y-direction, respecitively, and wherein said controller means determines the position of said implement in the X- and Y-directions in response to A.C. signals derived by said signal detecting means in response to responses from said X-direction first and second coil groups and said Y-direction first and second coil groups.

4. The position detecting apparatus of claim 2, wherein said selector means includes a multiplexer connected to said loop coils of each of said first and second coil groups for successively selecting said loop coils of each of said first and second coil groups one by one, said multiplexer being controlled by said controller means.

5. The position detecting apparatus of claim 2, wherein each of said loop coils of said first coil group includes a first series of said substantially rectangular coil sections continuously extending from a first end to a second, opposite end of said substrate and a second series of said substantially rectangular coil sections continuously extending from the second end to the first end of said substrate, said first and second series of said substantially rectangular coil sections being connected through a connection part corresponding to said third part, and wherein each of said loop coils of said second coil group includes a third series of said substantially rectangular coil sections continuously extending from the first end to the second end to the first end of said substrate, said third and fourth series of said substantially rectangular coil sections being connected through another connection part corresponding to said sixth part.

6. The position detecting apparatus of claim 2, wherein each of said coil groups includes a combination of a plurality of loop coils having the same pattern.

7. The position detecting apparatus of claim 2, further comprising switching means for alternately connecting said signal generating means and said signal detecting means to the selected loop coils, so that each of said loop coils alternately transmits an electric wave having the resonant frequency to the tuning circuit and receives an electric wave having the resonant frequency from the tuning circuit.

8. A tablet for enabling detection of the position of an implement having a structure for affecting an electric wave having a predetermined frequency, the tablet comprising first and second substantially co-planar overlapping coil groups each including plural loop coils, each of said loop coils including plural series connected coil sections, each of said coil sections including a pair of parallel elongated segments spaced from each other by a predetermined pitch, a substantial interaction occurring between a loop coil having a coil section in closet proximity to the implement and the wave affected by the implement so that a maximum response occurs in the loop coil having the coil section in closet proximity to the implement, the pitches of the first and second groups being respectively P1 and P2, the elongated segments of the different loop coils of the different coil groups being parallel to each other, adjacent elongated segments of different loop coils of the first and second groups being respectively spaced from each other by $d_1$ and $d_2$.

9. The tablet of claim 8 wherein each of $d_1$ and $d_2$ is less than either of P1 or P2.

10. The tablet of claim 8 wherein the coil sections of said loop coils are arranged so that (a) adjacent elongated segments of each individual loop coil are significantly closer to each other than $d_1$ or $d_2$ and (b) current flowing through the adjacent elongated segments in response to the interaction always has the same relative direction, the adjacent elongated segments being in different coil sections of the same loop coil.

11. The tablet of claim 10 wherein a pair of said first and second coil groups are included, the elongated segments in the first of said pair extending at right angles to the elongated segments in the second of said pair.

12. The tablet of claim 8 wherein a pair of said first and second coil groups are included, the elongated segments in the first of said pair extending at right angles to the elongated segments in the second of said pair.

13. The tablet of claim 8 wherein each of said loop coils extends over a majority of a position detection area of the tablet for the implement.

14. A tablet for enabling detection of the position of an implement having a structure for affecting an electric wave having a predetermined frequency, the tablet comprising plural co-planar loop coils, each of said loop coils including at least several series connected coil sections, each of said coil sections including a pair of parallel elongated segments spaced from each other by a predetermined pitch so that the pitch of all of the coil sections of a plurality of said loop coils is the same, a substantial interaction occurring between a loop coil having a coil section in closet proximity to the implement and the wave affected by the implement so that a maximum response occurs in the loop coil having the coil section in closet proximity to the implement, the elongated segments of the different loop coils being parallel to each other, the coil sections of said loop coils being arranged so that adjacent elongated segments of each individual loop coil are significantly closer to each other than said pitch and current flowing through the adjacent elongated segments in response to the interaction always has the name relative direction, the adjacent elongated segments being in different coil sections of the same loop coil.

15. The tablet of claim 14 wherein a pair of said plural co-planar loop coil are included, the elongated segments in the first of said pair extending at right angles to the elongated segments in the second of said pair.

16. The tablet of claim 14 wherein each of said loop coils extends over a majority of a position detection area of the tablet for the implement.

17. Apparatus for detecting the position of an implement having a structure for affecting an electric wave having a predetermined frequency, comprising a tablet having a surface on which the implement is to be placed, the tablet including first and second substantially co-planar overlapping coil groups each including plural loop coils, each of said loop coils including plural series connected coil sections, each of said coil sections including a pair of parallel elongated segments spaced from each other by a predetermined pitch, a substantial interaction occurring between a loop coil having a coil section in closet proximity to the implement and the wave affected by the implement so that a maximum response from the structure occurs in the loop coil having the coil section in closet proximity to the implement, the pitches of the first and second groups being respectively P1 and P2, the elongated segments of the different loop coils of the different coil groups being parallel to each other, adjacent elongated segments of different loop coils of the first and second groups being respectively spaced from each other by $d_1$ and $d_2$, and means responsive to the response occurring in the loop coils at said frequency for indicating the position of the implement.

18. The apparatus of claim 17 where each of $d_1$ and $d_2$ is less than either of P1 or P2.

19. The apparatus of claim 17 wherein the coil sections of said loop coils are arranged so that: (a) adjacent elongated segments of each individual loop coil are signifantly closer to each other than $d_1$ or $d_2$, and (b) current flowing through the adjacent elongated segments in response to the interaction always has the same relative direction, the adjacent elongated segments being in different coil sections of the same loop coil.

20. The apparatus of claim 19 wherein a pair of said first and second coil groups are included, the elongated segments in the first of said pair extending at right angles to the elongated segments in the second of said pair, said means for indicating being responsive to the voltage induced in the loop coils of both of said pairs of coil groups to indicate the implement position in two coordinate directions.

21. The apparatus of claim 20 wherein a pair of said first and second coil groups are included, the elongated segments in the first of said pair extending at right angles to the elongated segments in the second of said pair.

22. The apparatus of claim 17 further including a source of the predetermined frequency, means for sequentially connecting the source having the predetermined frequency to the loop coils, the structure including a tuned circuit having a resonant frequency substantially equal to said predetermined frequency and interacting with energy derived from the loop coils to change the current flowing in the loop coils at the predetermined frequency so that the means for indicating is responsive to the change in current resulting from the energy interacting with the structure.

23. The apparatus of claim 22 wherein the coils are connected to the source during a first interval and energy is coupled back to the coils from the tuned circuit during a second interval while the coils are not responsive to energy at the predetermined frequency derived from the source.

24. The apparatus of claim 20 wherein each of said loop coils extends over a majority of a position detection area of the tablet for the implement.

25. In combination, an implement having a structure for affecting an electric wave having a predetermined frequency, a tablet having a surface on which the implement is to be placed, the tablet including first and second substantially co-planar overlapping coil groups each including plural loop coils, each of said loop coils including plural series connected coil sections, each of said coil sections including a pair of parallel elongated segments spaced from each other by a predetermined pitch, a substantial interaction occurring between a loop coil having a coil section in closet proximity to the implement and the wave affected by the implement so that a maximum response from the structure occurs in the loop coil having the coil sections in closet proximity to the implement, the pitches of the first and second groups being respectively P1 and P2, the elongated segments of the different loop coils of the different coil groups being parallel to each other, adjacent elongated segments of different loop coils of the first and second groups being respectively spaced from each other by $d_1$ and $d_2$, and means responsive to the response occurring in the loop coils at said frequency for indicating the position of the implement.

26. The combination of claim 25 where each of $d_1$ and $d_2$ is less than either of P1 or P2.

27. The combination of claim 25 wherein the coil sections said loop coils are arranged so that: (a) adjacent elongated segments of each individual loop coil are significantly closer to each other than $d_1$ or $d_2$, and (b) current flowing through the adjacent elongated segments in response to the interaction always has the same relative direction, the adjacent elongated segments being in different coil sections of the same loop coil.

28. The combination of claim 27 wherein a pair of said first and second coil groups are included, the elongated segments in the first of said pair extending at right angles to the elongated segments in the second of said pair, said means for indicating being responsive to the response occurring in the loop coils of both of said pair of coil groups to indicate the implement position in two coordinate directions.

29. The combination of claim 25 wherein a pair of said first and second coil groups are included, the elongated segments in the first of said pair extending at right angles to the elongated segments in the second of said pair.

30. The combination of claim 25 further including a source of the predetermined frequency, means for sequentially connecting the source having the predetermined frequency to the loop coils, the structure incluing a tuned circuit having a resonant frequency substantially equal to said predetermined frequency and interacting with energy derived from the loop coils to change the current flowing in the loop coils at the predetermined frequency so that the means for indicating is responsive to the change in current resulting from the energy interacting with the structure.

31. The combination of claim 30 wherein the coils are connected to the source during a first interval and energy is coupled back to the coils from the tuned circuit during a second interval while the coils are not responsive to energy at the predetermined frequency derived from the source.

32. The combination of claim 25 wherein each of said loop coils extend over a majority of a position detection area of the tablet for the implement.

33. A tablet for enabling detection of the position of an implement having a structure for affecting AC energy at a predetermined frequency, the energy being coupled between the structure and the tablet, the tablet comprising plural co-planar loop coils, each of said loop coils including plural series connected coil sections and extending over a majority of the area of the tablet so that the different loop coils extend over overlapping areas of the tablet, each of said coil sections including a pair parallel elongated segments spaced from each other by a predetermined pitch, a substantial interaction occurring between a loop coil having a coil section in closet proximity to the implement and the energy coupled between the structure and the structure so that a maximum response from the structure occurs in the loop coil having the coil section in closet proximity to the implement, the spacing and arrangement of the loop coils being such that the combined amplitudes of the responses occurring in the different loop coils provide an indication of the implement position in a coordinate direction at right angles to the elongated direction of the parallel elongated segments, the coil sections of said loop coils being arranged so that (a) adjacent elongated segments of each individual loop coil are significantly closer to each other than said pitch, and (b) current flowing through the adjacent elongated segments in response to the interaction always has the same relative direction, the adjacent elongated segments being in different coil sections of the same loop coil.

34. The tablet of claim 33 wherein a pair of said parallel co-planar loop coils are provided, the elongated segments of a first of the pair extending in a first coordinate direction, the elongated segments of a second of the pair extending in a second coordinate direction at right angles to the first direction.

35. Apparatus for determining the position of an implement having a structure for affecting AC energy at a predetermined frequency comprising a tablet, the tablet including first and second substantially co-planar overlapping coil groups each including plural loop coils, each of said loop coils including plural series connected coil sections and extending over a majority of the area of the tablet so that the different loop coils extend over overlapping areas of the tablet, each of said coil sections including a pair of parallel elongated segments spaced from each other by a predetermined pitch, the elongated segments of the different loop coils of the different coil groups being parallel to each other, a substantial interaction occurring between a loop coil having a coil section in closet proximity to the implement and the wave affected by the implement so that a maximum response from the structure occurs in the loop coil having the coil section in closet proximity to the implement, the spacing and arrangement of the loop coils being such that the combined amplitudes of the responses occurring in the different loop coils resulting from an interaction of the AC energy and the loop coils provide an indication of the implement position in a coordinate direction at right angles to the elongated direction of the parallel elongated segments, the pitches of the first and second groups being respectively P1 and P2, the elongated segments of the different loop coils of the different coil groups being paralllel to each other, adjacent elongated segments of different loop coils of the first and second groups being respectively spaced from each other by $d_1$ and $d_2$, and means combining the responses from a plurality of said coil groups for indicating the implement position.

36. The apparatus of claim 35 where each of $d_1$ and $d_2$ is less than either of P1 or P2.

37. The apparatus of claim 35 wherein the responses are combined in accordance with the calculus of finite differences.

38. The apparatus of claim 37 wherein the structure comprises a tuned circuit having a resonant frequency equal to said predetermined frequency, and further including an AC source for deriving said predetermined frequency, means for sequentially connecting said source to said loop coils, said tuned circuit interacting with an electric field derived from said loop coils to affect the current flowing in said loop coils.

39. The apparatus of claim 38 wherein the coils are connected to the source during a first interval and energy is coupled back to the coils from the tuned circuit during a second interval while the coils are not responsive to energy at the predetermined frequency derived from the source.

40. The apparatus of claim 39 wherein the position of the implement, $d_x$, is determined in accordance with $$d_x = \frac{|V_n - V_{n-1}| \, d_1}{|V_n - V_{n-1}| + |V_{n+1} - V_n|}$$

where:
$V_n$ is the amplitude of the voltage induced in the loop coil having the greatest voltage induced therein as a result of the interaction between the loop coil and the structure,
$V_{n-1}$ and $V_{n+1}$ are, respectively, the amplitudes of the voltages induced in loop coils closet to and on opposite sides of the loop coil wherein $V_n$ is induced.

41. The apparatus of claim 40 further including means for detecting the phase of the voltage in the loop coils as a result of said interaction.

42. The apparatus of claim 41 wherein the means for combining is responsive to the phase of the voltage in the loop coils as a result of said interaction, to indicate when the implement is on the tablet.

43. The apparatus of claim 36 wherein the coil sections of said loop coils are arranged so that (a) adjacent elongated segments of each individual loop coil are significantly closer to each other than said pitch, and (b) current flowing through the adjacent elongated segments in response to the interaction always has the same relative direction, the adjacent elongated segments being in different coil sections of the same loop coil.

44. Apparatus for detecting the position of an implement having a structure for affecting an electric wave having a predetermined frequency, comprising a tablet having: plural co-planar loop coils, each of said loop coils including at least several series connected coil sections, each of said coil sections including a pair of parallel elongated segments spaced from each other by a predetermined pitch so that the pitch of all of the coil sections of a plurality of said loop coils is the same, a substantial interaction occurring between a loop coil having a coil section in closet proximity to the implement and the wave affected by the implement so that a maximum response occurs in the loop coil having the coil section in closet proximity to the implement, the elongated segments of the different loop coils being parallel to each other, the coil sections of said loop coils being arranged so that adjacent elongated segments of each individual loop coil are significantly closer to each other than said pitch and current flowing through the adjacent elongated segments in response to the interaction always has the same relative direction, the adjacent elongated segments being in different coil sections of the same loop coil; and means responsive to the response occurring in the loop coils at said frequency for indicating the position of the implement.

45. The apparatus of claim 44 wherein a pair of said plural co-planar loop coils are included, the elongated segments in the first of said pair extending at right angles to the elongated segments in the second of said pair.

46. The apparatus of claim 44 wherein each of said loop coils extend over a majority of a position detection area of the tablet of the implement.

47. The apparatus of claim 44 further including a source of the predetermined frequency, means for sequentially connecting the source having the predetermined frequency to the loop coils, the structure including a tuned circuit having a resonant frequency substantially equal to said predetermined frequency and interacting with energy derived from the loop coils to change the current flowing in the loop coils at the predetermined frequency so that the means for indicating is responsive to the change in current resulting from the energy interacting with the structure.

48. The apparatus of claim 47 wherein the coils are connected to the source during a first level interval and energy is coupled back to the coils from the tuned circuit during a second interval while the coils are not responsive to energy at the predetermined frequency derived from the source.

49. The apparatus of claim 44 wherein each of said loop coils extends over a majority of a position detection area of the tablet of the implement.

50. In combination, an implement having a structure for affecting an electric wave having a predetermined frequency, a tablet including: plural co-planar loop coils, each of said loop coils including at least several series connected coil sections, each of said coil sections including a pair of parallel elongated segments spaced from each other by a predetermined pitch so that the pitch of all of the coil sections of a plurality of said loop coils is the same, a substantial interaction occurring between a loop coil having a coil section in closest proximity to the implement and the wave affected by the implement so that a maximum response occurs in the loop coil having the coil section in closest proximity to the implement, the elongated segments of the different loop coils being parallel to each other, the coil sections of said loop coils being arranged so that adjacent elongated segments of each individual loop coil are significantly closer to each other than said pitch and current flowing through the adjacent elongated segments in response to the interaction always has the same relative direction, the adjacent elongated segments being in different coil sections of the same loop coil; and means responsive to the response occurring in the loop coils at said frequency for indicating the position of the implement.

51. The combination of claim 50 wherein a pair of said plural co-planar loop coils are included, the elongated segments in the first of said pair extending at right angles to the elongated segments in the second of said pair.

52. The combination of claim 50 wherein each of said loop coils extends over a majority of a position detection area of the tablet for the implement.

53. The combination of claim 50 further including a source of the predetermined frequency, means for sequentially connecting the source having the predetermined frequency to the loop coils, the structure including a tuned circuit having a resonant frequency substantially equal to said predetermined frequency and interacting with energy derived from the loop coils to change the current flowing in the loop coils at the predetermined frequency so that the means for indicating is responsive to the change in current resulting from the energy interacting with the structure.

54. The combination of claim 53 wherein the coils are connected to the source during a first interval and energy is coupled back to the coils from the tuned circuit during a second interval while the coils are not responsive to energy at the predetermined frequency derived from the source.

55. The combination of claim 50 wherein each of said loop coils extends over a majority of a position detection area of the tablet for the implement.

* * * * *